MANUFACTURE OF SPECTACLE FRAMES

Original Filed March 12, 1959 4 Sheets-Sheet 1

INVENTOR.
WILLIAM P. ROWLAND
BY
Peter S. Costas
ATTORNEY

MANUFACTURE OF SPECTACLE FRAMES
Original Filed March 12, 1959 4 Sheets-Sheet 2
Fig. 5.
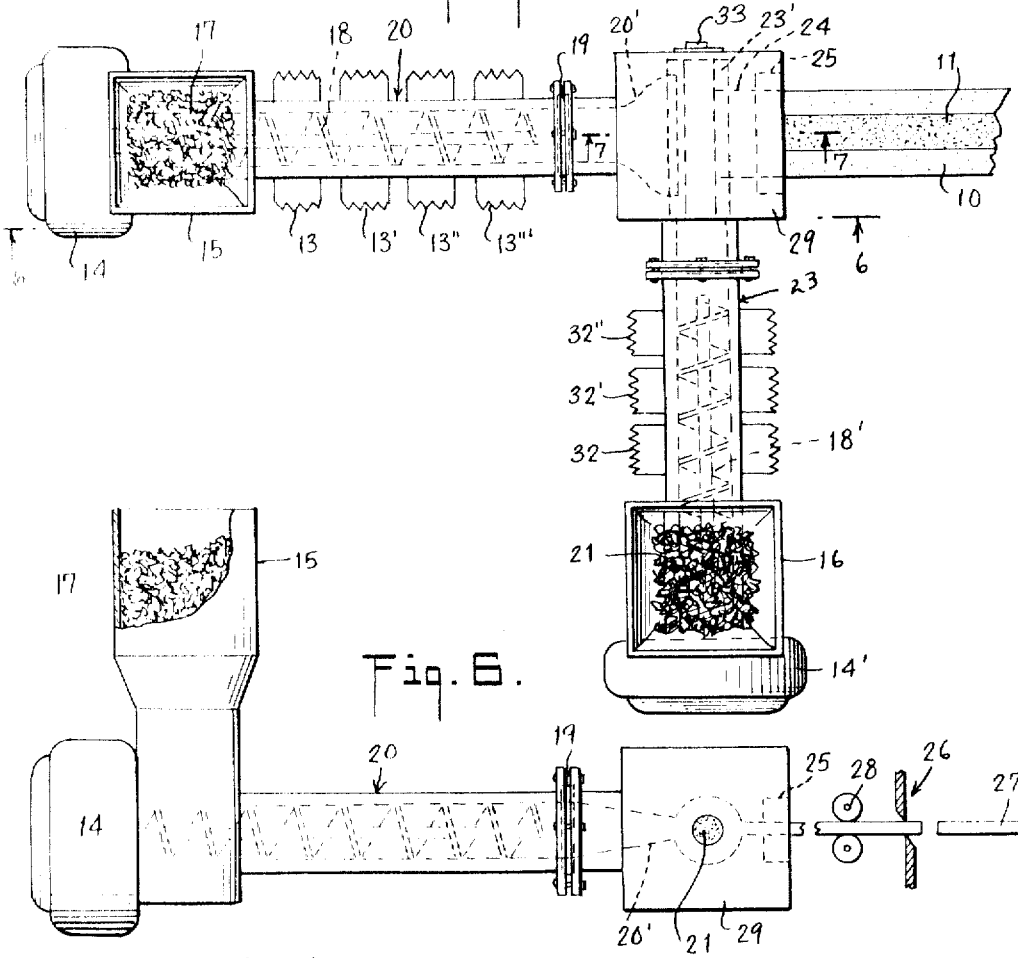
Fig. 6.
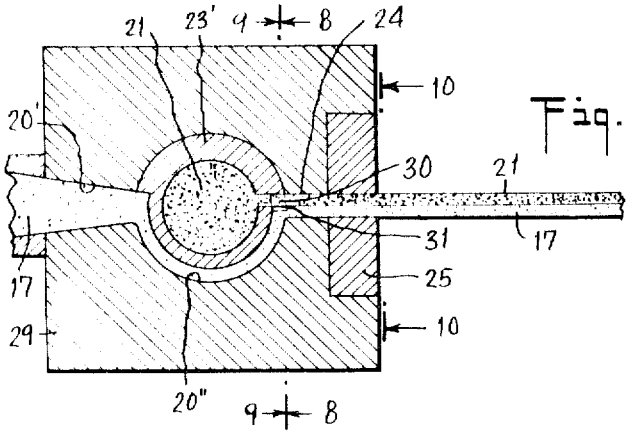
Fig. 7.
INVENTOR.
WILLIAM P. ROWLAND
BY
Peter L. Costas
ATTORNEY

MANUFACTURE OF SPECTACLE FRAMES

Original Filed March 12, 1959 4 Sheets-Sheet 3

INVENTOR.
WILLIAM P. ROWLAND
BY
Peter L. Costas
ATTORNEY

MANUFACTURE OF SPECTACLE FRAMES

Original Filed March 12, 1959 4 Sheets-Sheet 4

INVENTOR.
WILLIAM P. ROWLAND
BY Peter L. Costas
ATTORNEY

United States Patent Office

Re. 26,237
Reissued July 18, 1967

26,237

MANUFACTURE OF SPECTACLE FRAMES

William P. Rowland, Southington, Conn., assignor to Rowland Products, Inc., Kensington, Conn., a corporation of Connecticut Original No. 2,985,556, dated May 23, 1961, Ser. No. 798,948, Mar. 12, 1959. Application for reissue Oct. 11, 1965, Ser. No. 500,476
13 Claims. (Cl. 156—244)

Matter enclosed in heavy brackets [ ] appears in the original patent but forms no part of this reissue specification; matter printed in italics indicates the additions made by reissue.

This invention relates to the manufacture of spectacle frames from plastic material and, more particularly to spectacle frames having a gradient color appearance either in a solid color or in a two-tone or two-color effect.

One of the objects of the invention is to provide a novel spectacle frame from plastic material and in which a desired color is of a predetermined density in a localized area of the frame and fades out gradually from such area into clear plastic or into another color which gradually increases in intensity to a second localized area of maximum density thereof.

Another object of the invention is to provide a spectacle frame in which there is provided novel two-tone or two-color effects without removing any material from the front or back of the frame by skiving or any other known method of accomplishing such removal of material.

A further object of the invention is to provide a novel spectacle frame from a composite piece of plastic material composed of a plurality of layers of different colors of uniform density but constructed to provide a unitary gradient density material providing a two-tone or two-color appearance.

A still further object of the invention is to provide novel spectacle frames from plastic material composed of a plurality of layers of different colors and adapted to be constructed in a variety of patterns to provide a large number of gradient two-tone or two-color designs without requiring the removal of any of the plastic material from the frames.

Other objects of the invention, as well as the novel features thereof, will appear from a perusal of the following description when read in connection with the accompanying drawings, in which FIG. 1 is a perspective view of an end portion of plastic layer which is made in the form of a strip of any desired length or width;

FIG. 5 is a top plan view of apparatus for making the strip shown in FIG. 1;

FIG. 6 is a vertical sectional view looking along the line 6—6 of FIG. 5 and showing in addition to the mechanism of FIG. 5, means for cutting the strip longitudinally and for chopping it into predetermined lengths.

FIG. 7 is a sectional view taken along the line 7—7 of FIG. 5 and illustrates the manner in which the differently colored layers of plastic material are combined to form the strip;

Figure 1:
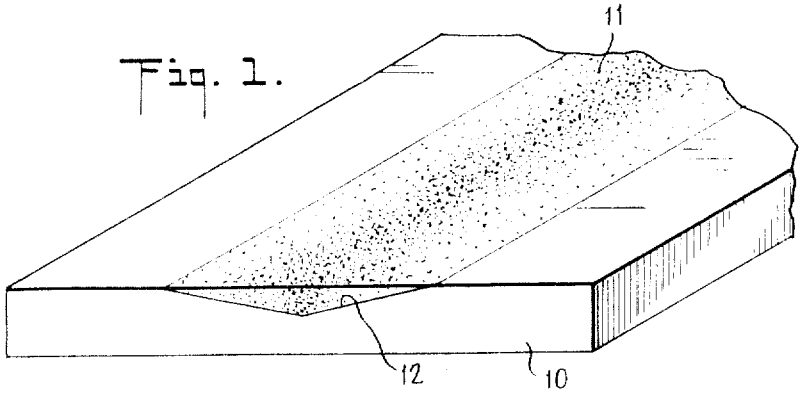

In FIG. 1 of the drawings, the reference numeral 10 designates a base strip of plastic which may be clear or of any desired color or design. The base strip 10 may be made of any desired length, width and thickness. Embedded in the top surface of the strip 10, as viewed in FIG. 1, is a second strip 11 of plastic material of a color or design in contrast with the color or design of strip 10. It will be noted that the composite or unitary strip composed of the combined strips 10 and 11 is substantially rectangular in cross-section and that its top surface is formed by the top surfaces of the strips 10 and 11 which are flush with each other to provide a plane surface. The remaining surfaces of the unitary strip are formed by the material of strip 10. The top surface of strip 10 is provided with a centrally located, longitudinally extending depression 12 of V-shaped cross-section and in which is located the strip 11 having a triangularly-shaped cross-sectional area conforming exactly to the cross-sectional area of the depression. The depression 12 at the longitudinal center of the combined strip has a depth depending on the color effect to be produced in such area. For example, if strip 10 is made of clear plastic and strip 11 of colored plastic, the area of densest color will appear along the longitudinal center of the strip and the density of this color effect will depend upon the thickness of strip 11 in such region. For the purposes of the invention it has been found that the depth of depression 12 along the centerline of the combined strip or the thickness of strip 11 along its longitudinal center may range from 30 to 150 thousandths of an inch. The sides of the depression 12 and consequently the bottom angularly disposed surfaces of the strip 11 which are integrally united to such sides, slope upwardly gradually from the longitudinal center of the combined strip to the top surfaces of the strip 10. The degree of slope of such sides and surfaces will depend on the color or design effect desired and whether a two-color effect or a gradient effect in a single color is desired. Thus a two-color effect is attained by making the strip 11 of less width than strip 10, as shown in FIG. 1 of the drawings. On the other hand, it will be apparent that if strip 11 is made of the same width as strip 10 it is possible to obtain a graduated effect in a single color. Whatever the desired width of strip 11 relative to strip 10 the sides of depression 12 should taper gradually so that the thickness of strip 11 towards its longitudinal side edges thereof gradually becomes less and less until it is so minute at such edges as to be considered infinitesimal for all practical purposes.

It will be understood from the foregoing description of the unitary strip depicted in FIG. 1 of the drawings, that even though the materials of strips 10 and 11 may have a uniform color appearance, such strip will produce a gradient color appearance when viewed either through the top or the bottom surface thereof. Thus, assuming that the strip 10 is made of clear plastic material and the strip 11 is made of plastic material which has been given a uniform desired transparent, opaque or translucent color, when the unitary strip is viewed as aforesaid, the longitudinal center thereof will show the greatest density of the color of strip 11. The density in appearance of the color in such region will depend on the thickness of strip 11 along its longitudinal center. From the longitudinal center of the unitary strip, the color will fade out gradually in both transverse directions towards the longitudinal edges of strip 11. As the thickness of such edges is quite small, the color will have the appearance of fading into nothing with no demarcation obserable at a distance between the colored and the clear plastic materials. This effect is even more pronounced when the combined material is observed in the spectacle frame produced from such unitary strip. It will be understood also that color materials may be incorporated in the strips 10 and 11 to provide a non-uniform or mottled appearance or design in which case the color effect produced will be more complicated.

The strips 10 and 11 may be made of any known suitable thermoplastic material such as the acetate and butyrate plastics and of which numerous types are commercially available. Preferably those thermoplastics which have an extrudable temperature of approximately 400° F. and are capable of being laminated with the aid of suitable cements known to the art at temperatures approximating 270° F. are utilized in the practice of the invention. As above indicated the plastic material of either strip 10 or strip 11 may be clear or colored and whether one of such strips is clear or colored, the other strip is preferably made of a contrasting color. For the purposes of describing and claiming this invention, a clear plastic shall be considered as a color. The thermoplastic material of both strips 10 and 11 is preferably the same, this material in the one strip being given a different color than this material in the other strip by incorporating therein a suitable color agent. Thus, if the thermoplastic material is to be given a suitable transparent color, an organic dye such as Quinizarine Green may be incorporated therein. On the other hand, if the material is to be provided with an opaque color, pigments such as Watchung Red or Iron Oxide may be mixed therewith. The thermoplastic material may be given a translucent color by suitably mixing suitable dyes and pigments with the material.

The plastic materials forming the layers 10 and 11 may be combined into a unitary strip with the aid of apparatus such as is illustrated in FIGS. 5 to 10 of the drawings. It will be understood that while such apparatus is described with regard to the production of the unitary strip shown in FIG. 1, it may be modified to produce other forms of such strips as will be readily recognized by those skilled in the art. In the apparatus illustrated the plastic material for strip 10 is deposited in hopper 15 thereof and the plastic material for strip 11 is deposited in hopper 16 thereof. The plastic material is pushed from each hopper into an associated conduit by suitable feed screw mechanism and in the travel of such material through the conduit it is heated to bring it to the desired extruding temperature therefor. Thus in the case of hopper 15, the plastic material 17 deposited therein in the form of dry pellets is pushed by an associated feed screw 18 driven by a suitable motor 14, through a conduit which is designated generally by the numeral 20, and toward an extrusion hole provided in a collar 19 located at the end of the feed screw 18. In their travel through the conduit 20, the plastic pellets 17 pass through a plurality of successive heating zones 13, 13', 13'' and 13''', which melt the plastic material of such pellets and bring the same to a condition in which it may be properly extruded through the hole in the collar 19. As indicated in FIG. 5 of the drawings, the zones 13, 13', 13'' and 13''' may be heated electrically and such zones may be separately controlled to subject the plastic material passing through associated sections of the pipe 20 to any desired arrangement of predetermined temperatures. The extrusion hole in collar 19 is configured so that its discharge end continues in a stream-lined manner into the entry end of a horizontal, longitudinally extending, closed intermediate section 20' of conduit 20 formed in a block 29. The conduit section 20' is formed to gradually change the cross-sectional configuration of the extruded plastic material to an approximately rectangular shape conforming to the shape of the inlet end of a curved end section 20'' of conduit 20 located within the block 29 and having an area approximating that of the cross-sectional area of the unitary strip to be produced.

The hopper 16 is in a position advanced with relation to hopper 15 and the plastic material 21 deposited therein in the form of dry pellets is fed forwardly therefrom through a conduit which is indicated generally by the numeral 23, by the associated feed screw 181 driven by its own motor 14' in a manner similar to feed screw 18. As the pellets of plastic material advance through conduit 23 they pass through successive heating zones 32, 32' and 32'', which function in a manner similar to the heating zones associated with conduit 20 to transform the plastic material of the pellets to the desired molten condition for proper feeding through a discharge opening 30 in a pipe section 23' as will hereinafter be more fully explained. As is shown in the drawings, pipe section 23' forms an end extension of the main portion of conduit 23 and is circularly-shaped with a diameter less than the horizontal transverse dimension of the main portion of pipe 23. The outer end of pipe extension 23' is closed by a suitable plug 33 threadedly engaged therewith. Pipe 23' extends across the discharge end of conduit section 20' and is formed at the place of its intersection with conduit section 20' of conduit 20 to provide the top and side walls which define such conduit section 20'. The remaining bottom wall of conduit section 20' is formed by the block 29. It will be noted that while the molten plastic masses are being forced through the conduits 20 and 23, the feed screws 18 and 18' exert pressure in the advancing direction on the molten masses to force them through the extrusion hole of collar 19 and the discharge opening 30 in pipe 23', respectively, and that the latter in each case substantially aids in the creation of a back pressure on the molten mass being forced therethrough, thereby providing a head on each of the streams of molten plastic. By proper control of the speeds of rotation of the feed screws and consequently the heads on the plastic materials fed thereby, the conduits 20 and 23 and the connecting conduit 24 leading to the final extrusion die 25 are kept filled with controlled amounts of the plastic materials under proper pressure so that such materials are caused to flow quietly and without turbulence to die 25 and to be formed by the latter into the correct desired shape.

At the place of intersection of the conduits 20 and 23, the former curves down under and then around the latter to the other side of conduit 23 to continue as conduit 24 towards the die 25 in a horizontal direction substantially aligned with the direction of feed of conduit 20 up to pipe 23. It will be noted in FIGS. 6 to 9 of the drawings, that the conduit 23 at such place of intersection has a discharge opening 30 through which the molten plastic material 21 in conduit 23 is discharged into the entry end of conduit 24. The opening 30 is so located relative to conduit 24 that the plastic material 21 is discharged into the upper central portion of such conduit. Discharge opening 30 has a triangular configuration substantially similar in shape and area to the cross-section of strip 11 but is reversed so that the apex of such opening is on top. The longest side 31 of such opening opposite the apex is tangent to the top surface of the plastic material 17 entering conduit 24 from the curved end of conduit 20 so that a triangular ribbon of the plastic material 21 passing through opening 30 is laid upon the longitudinal central portion of such top surface as the material 17 flows by such opening. Because of the form of opening 30, the plastic material 21 will form a stream of like configuration as it is deposited on the plastic material 17. However, as the two layers or streams of molten materials 17 and 21 move away from the opening 30, the material 21 will reverse itself so that by the time such materials reach the portion of conduit 24 indicated by the dotted lines 10—10 they will have the configuration shown in FIG. 10 of the drawings.

Figure 3:
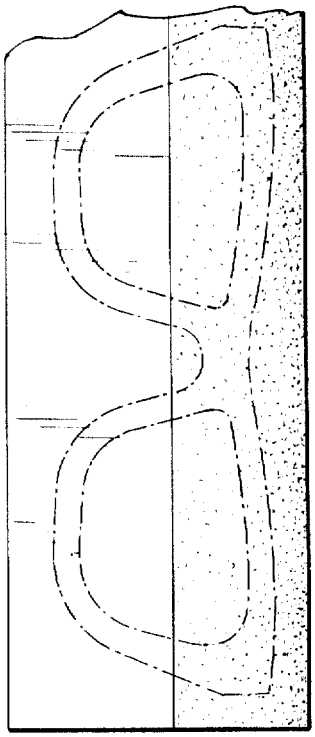
FIG. 3 is a top plan view of the strip shown in FIG. 2 and illustrates the manner in which a spectacle frame may be cut out from such strip.
Figure 4:
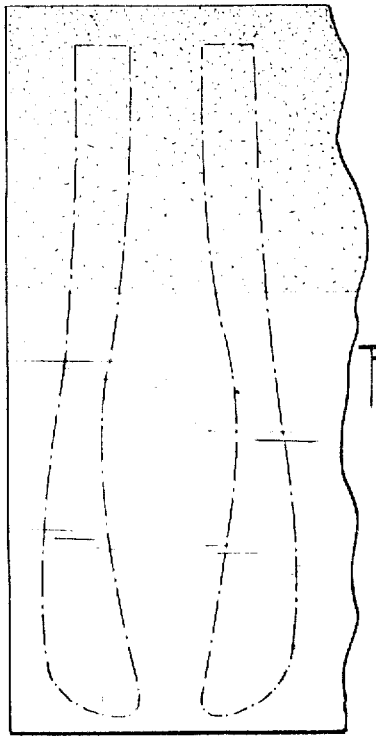
FIG. 4 is a top plan view of a strip substantially similar to that shown in FIGS. 2 and 3 but having a width more adaptable to the formation of temples therefrom.
Figure 8:
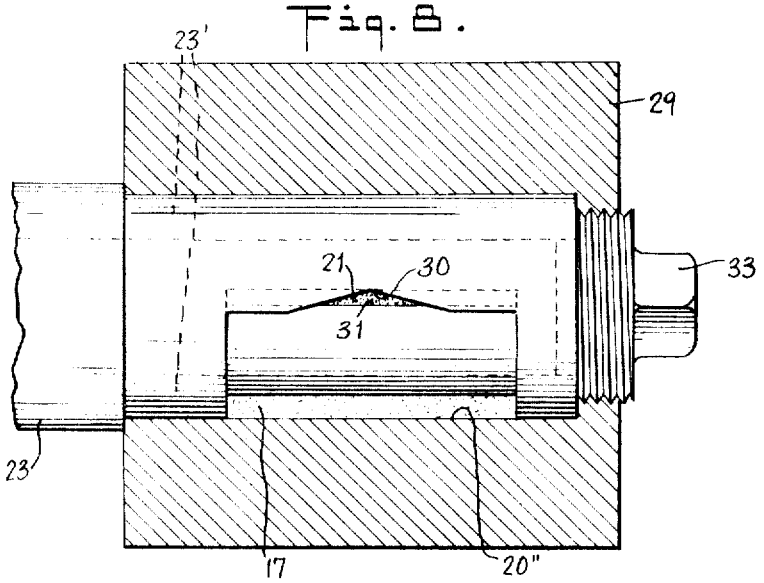
FIG. 8 is a sectional view looking toward the line 8—8 of FIG. 7.
Figure 9:
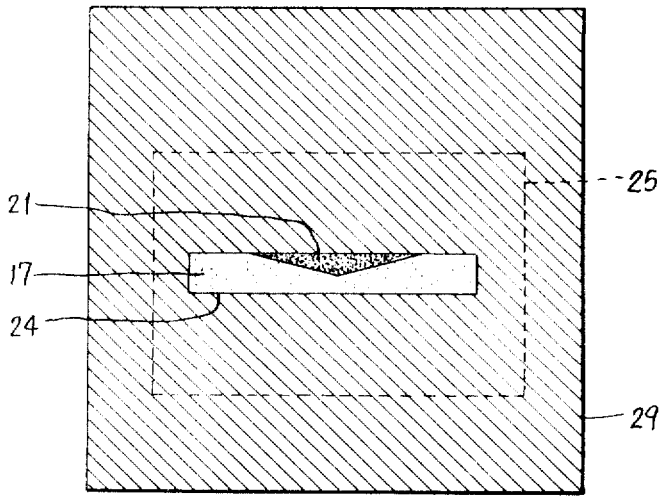
FIG. 9 is a sectional view looking toward the line 9—9 in FIG. 7.
Figure 10:
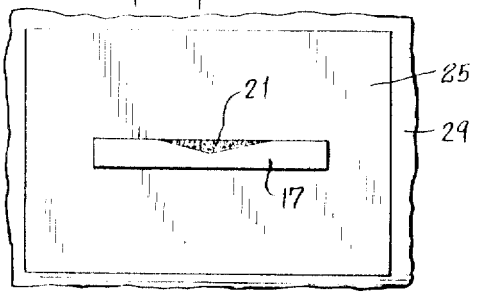
FIG. 10 is a sectional view taken along the line 10—10 of FIG. 7.

The die 25 will give the materials 17, 21 the final correct configuration they will have as strips 10 and 11, respectively, in the unitary plastic strip. As a result of this operation also, the combined plastic materials forming the composite strip will have an "as extruded" surface appearance in their hardened condition, as distinguished from the surfaces provided by press-polishing, machining, skiving, or otherwise treating the plastic material. As the composite strip leaves the die 25, the plastic materials are air cooled and at a place spaced from such die, the strip formed thereby is fed into the field of action of cutting instrumentalities 26 which while the strip moves continuously therethrough, chops the strip into predetermined lengths 27. A twenty-six inch length of the type of strip shown in FIG. 1 of the drawings will provide sufficient material for eight frames, whereas sixteen or eighteen frames may be obtained from a fifty-two inch length thereof. The manner in which such frames may be cut out of the strip lengths 27 is indicated in FIG. 3 of the drawings while FIG. 4 indicates the manner in which the temples for such frames may be cut out of the strip lengths. The spectacle frames and temples may be cut from the strip lengths 27 by feeding the latter to a suitable stamping machine of known construction, or by cutting such spectacle parts from the strips in other ways known to the art.

Figure 2:
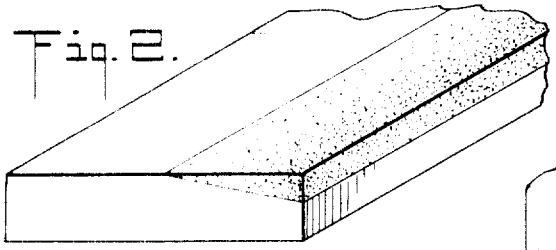
FIG. 2 is a similar view showing a longitudinally divided half of the strip shown in FIG. 1.

It will be understood that the strip formed as aforesaid may have a width equal to the combined width of a plurality of the strips shown in FIG. 1. In the production of such a strip, the conduit 23 would be provided with a plurality of openings 30 to deposit a plurality of spaced strips of the molten plastic material 21 upon the stream of molten plastic material 17. The resulting cooled strip may then be cut longitudinally as by the revolving knives 28 in FIG. 6 into a plurality of separate strips such as shown in FIG. 1 before feeding the processed material to the cutting mechanism 26. The strip shown in FIG. 1 of the drawings may also be cut longitudinally by the knives 28 to provide two strips of the configuration shown in FIGS. 2 and 3 of the drawings and which are then chopped into the desired lengths. The strip of FIGS. 2 and 3 can, of course, be made originally in the form shown according to the method described with respect to the strip of FIG. 1 by making the obvious necessary changes in the various material discharge openings.

Figure 13:
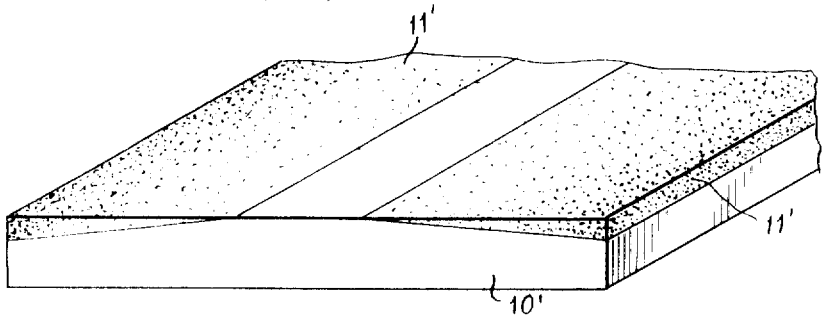

Instead of forming the strip 11 as a single strip in the longitudinal center of the base strip 10, the former may be formed as two divided strips 11', 11' along the longitudinal side edges of the strip 10' as illustrated in FIG. 13 of the drawings. In the construction of the strip of FIG. 13 it is preferred that the color of the strips 11', 11' fade into the longitudinal central portion of strip 10'. Accordingly, the strips 11', 11' will have their greatest thicknesses at the side edges of strip 10'. It is obvious, however, that such condition may be reversed to obtain a different desired color effect.

Figure 11:
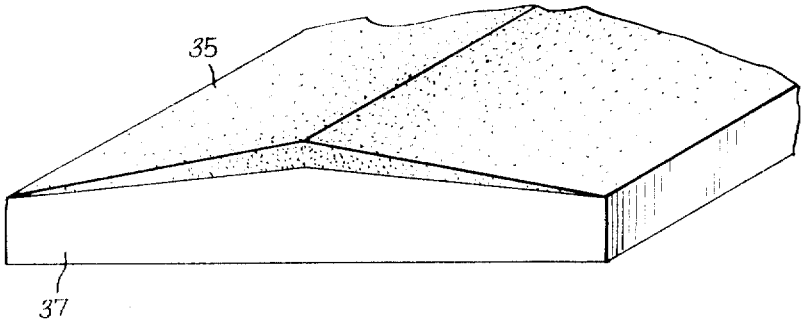
FIGS. 11, 12 and 13 are perspective views of the end portions of different plastic strips illustrating other ways in which the differently colored plastic layers may be combined to obtain other gradient color effects.
Figure 12:
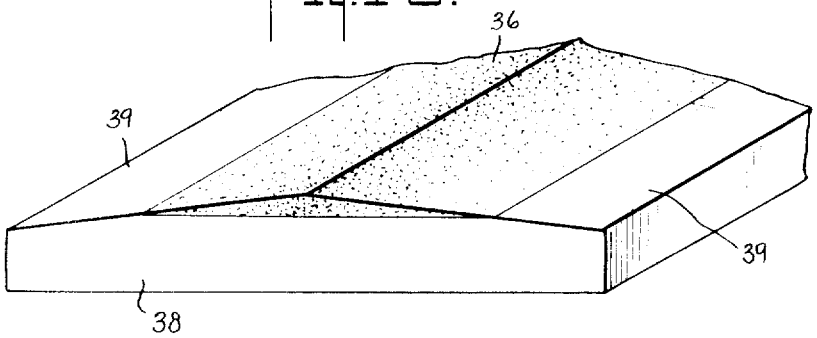

FIGS. 11 and 12 illustrate two further constructions that may be made and in which the longer sides of the triangularly-shaped strips 35 and 36 are joined with the top surfaces of the base strips 37 and 38, respectively, so that the shorter angularly disposed sides of such strips extend upwardly from and form apexes above such top surfaces. In the construction of FIG. 11, the base strip 37 has a ridged top surface and the triangularly-shaped strip 35 has width equal to that of such base strip so that the gradient density material formed by such strips has a gradual changing color effect throughout its entire width. Thus, if strip 37 is made of clear plastic material and strip 35 of colored plastic material, the gradient density material will have the greatest density of the color of strip 35 along its longitudinal center and such density of color will fade out gradually towards the side edges of such gradient density material. In the construction of FIG. 12, the strip 36 is narrower than the base strip 38 to provide a color effect which is somewhat similar to that produced by the composite strip of FIG. 1. It will be noted also in connection with the construction of FIG. 12 that the top surfaces of the longitudinal edge portions 39, 39 of the base strip 38 are inclined so that they are in the same plane with and form a continuation of the upper inclined surfaces of the triangularly-shaped strip 36.

While I have hereinabove illustrated and described preferred methods of manufacturing spectacle frames in accordance with the invention, it will be apparent to those skilled in the art that various changes and modifications may be made therein without departing from the spirit of the invention or the scope of the appended claims. Thus, instead of making the second strip 11 in FIG. 1 of triangular cross-sectional area, such strip may be made of any other suitable cross-sectional configuration, such as semi-elliptical. Also the strip 11 need not conform in cross-sectional area exactly to the cross-sectional area of the depression, but may have a cross-sectional area differing from that of the latter both in configuration and size. Also, when it is stated that the edges of such a strip 11 are practically infinitesimal in thickness, it will be understood that such edges will have measurable thickness. It is also within the contemplation of the invention to construct the strip 11 so that the edges thereof will have a fairly substantial thickness. It will be apparent also that the strips combined to form the composite strip of this invention may have other configurations than those hereinabove described and illustrated in the drawings to obtain different gradient color effects. With regard to those composite strips produced in the manner above described, it is of interest to note that a reversal of the plastic material superposed on the base strip as in the strip of FIG. 1, usually occurs when the latter is formed as a flat strip having a substantially rectangular cross-sectional configuration. When, however, the base strip is made in other forms, such as the wedge-shaped forms shown in FIGS. 11 and 12, this reversal of the material superposed on the base strip does not take place and the latter solidifies on the base strip in substantially the form in which it is deposited thereon. The above described method of making the composite strips may also be slightly modified to produce still further variations in the forms of the strips. Thus, instead of having the conduit 20 curve under the conduit 23 at the place of intersection thereof, the pipe section 23' and block 29 may be formed to cause the conduit section 20'' to curve up and over the pipe section 23' and to discharge into the upper portion of conduit 24. In the use of this arrangement therefore, the plastic material 17 to form the base strip of the product is discharged from section 20'' upon the stream of molten plastic material 21 feeding through the opening 30 of pipe section 23'. It will also be apparent that the pipe section 23' and block 29 may be formed so that conduit section 20'' may be constituted of two passages extending over and under the pipe section 23' and discharging the plastic material 17 into the entry end of conduit 24 above and below the opening 30 in pipe section 23'. In the use of such a construction, the plastic material 21 discharging through opening 30 will be sandwiched between the material 17 coming from the dual discharge ends of pipe section 20''. By changing the configuration of such dual discharge ends and the opening 30 a number of additional forms of the composite strip may be attained.

I claim:

1. The method of making spectacle parts, comprising forming a light-transmittible, composite, rectilinear strip having substantial ridigity at ordinary temperatures by uniting *in a closed conduit* to a *molten stream of synthetic plastic material for a* base layer of light-transmittible plastic material of a given color and of substantial rigidity at ordinary temperatures, a second *molten stream of synthetic plastic material to form a second* layer of a differently colored light-transmittible plastic material having an area of maximum thickness and gradually diminishing in thickness from such area and for a major part of the width of said second layer to an edge thereof so that the thickness of the latter is practically infinitesimal; *cooling said united streams to form said substantially rigid composite strip;* and cutting such composite strip to produce a spectacle part having a gradient color appearance.

2. The method of making spectacle parts which comprises feeding a rectilinearly-shaped molten stream of light-transmittible plastic material of a given color and of substantial rigidity at ordinary temperatures through a closed conduit of a given rectilinear cross-sectional configuration, joining with said stream a rectilinearly-shaped molten ribbon of light-transmittible plastic material of a given color contrasting with the color of said stream of plastic material and of substantial[ly] rigidity at ordinary temperatures, and having a cross-sectional area such that said ribbon has an area of maximum thickness extending lengthwise thereof and gradually diminishes in thickness from such area of maximum thickness and for a major part of the width of such ribbon toward a longitudinal edge thereof, cooling said joined plastic materials to form a substantially rigid composite strip thereof, and cutting out spectacle parts from the composite strip material in such manner and that the gradient layer thereof provides a gradient color appearance in the part.

3. The method defined in claim 2 in which said molten ribbon is continuously deposited on a surface of said molten stream as said stream continuously flows past the place of deposit of said ribbon and so that the composite strip formed therefrom will have given light-transmitting characteristics.

4. The method of making spectacle parts which comprises feeding a rectilinearly-shaped molten stream of light-transmittible plastic material of a given color and of substantial rigidity at ordinary temperatures through a closed conduit of a given rectilinear cross-sectional configuration to a place of juncture and at the latter causing said stream to bend in its flow; joining with said stream at such bend in the flow thereof a second rectilinearly-shaped molten stream of light-transmittible plastic of a given color contrasting with the color of said first stream of plastic material and having a longitudinally extending area of maximum thickness and gradually diminishing in thickness from such area and for a major part of the width of said second stream toward a longitudinal edge thereof, cooling said materials to form a substantially rigid composite strip thereof and cutting spectacle parts from such composite strip in such manner that the gradient layer thereof provides a gradient color appearance in the cut spectacle part.

5. The method defined in claim 4 in which said first stream at said place of juncture is flowing in a direction transverse to the direction of flow of said second stream to said place of juncture and is bent into a horizontal path of flow, and in which said second stream is discharged through an opening at said place of juncture so as to be fed into substantially tangential relation with a surface of said first stream.

6. The method defined in claim 4 in which said second stream is superposed on said first stream with its cross-section inverted from the condition it will have in the finished composite strip and in which said first stream is given a substantially rectangular cross-sectional configuration by said closed conduit such that as the combined streams flow away from said place of juncture, the cross-section of said second stream is caused to reverse itself from its deposited condition to the condition it will have in the finished composite strip.

7. The method defined in claim 4, in which said cooled composite strip is cut longitudinally to provide a plurality of substantially similarly constructed strips before feeding such strips to the spectacle part cutting means.

8. The method of making spectacle frames which comprises *feeding a molten stream of light-transmittible synthetic plastic material into a closed conduit, feeding into said closed conduit a second molten stream of light transmittible synthetic plastic material having a color contrasting to that of the first stream to cause said streams to unite in said conduit to form* [taking] a rectilinearly-shaped, gradient density material having substantial rigidity at ordinary temperatures and formed of two strips of contrasting colored light transmittible plastic material and one of which gradually diminishes in thickness over a given area for a major part of the width of the strip thereof to produce a gradient color appearance in such area, *cooling said united streams to form a substantially rigid composite material,* then cutting out the spectacle part from such material in such manner that the gradient color appearance thereof appears in such part.

[9. A spectacle part having a gradient color appearance and composed of two layers of material, one of said layers being composed of plastic material of a given color, and the other of said layers being joined with said one layer and being composed of plastic material of a given color contrasting with the color of said one layer, said layers being joined by the direct cohering engagement of opposed surface portions thereof with the aid of heat, said other layer having an area of maximum thickness and gradually diminishing in thickness from such area of maximum thickness toward an edge thereof, whereby said layers in the area occupied by both said layers thereof provides in the area of maximum thickness of said other layer the greatest density of color of said other layer and outside of such area of maximum thickness a gradual fading of such color from such area toward the edge of said other layer.]

[10. A spectacle part such as defined in claim 9, in which said one layer is substantially greater in cross-sectional area than said other layer and constitutes the body layer, and in which said other layer continuously diminishes in thickness to edges thereof at which its thickness is practically infinitesimal.]

[11. An intermediate product for use in the manufacture of spectacle parts comprising a composite strip composed of two layers of material, one of said layers beincomposed of plastic material of a given color, and the other of said layers being joined with said one layer and being composed of plastic material of a given color contrasting with the color of said one layer, said layers being joined by the direct cohering engagement of opposed surface portions thereof with the aid of heat, said other layer having an area of maximum thickness and gradually diminishing in thickness from such area of maximum thickness toward an edge thereof, whereby said layers in the area occupied by both said layers thereof provides in the area of maximum thickness of said other layer the greatest density of color of said other layer and outside of such area of maximum thickness a gradual fading of such color from such area toward the edge of said other layer.]

[12. An intermediate product such as defined in claim 11, in which said one layer is substantially greater in cross-sectional area than said other layer and constitutes the body layer, and in which said other layer continuously diminishes in thickness to edges thereof at which its thickness is practically infinitesimal.].

13. The method of making plastic material parts which comprises forming a light-transmittible composite rectilinear strip having substantial rigidity at ordinary temperatures by uniting *in a closed conduit* to *a molten stream of synthetic plastic material forming* a rectilinearly-shaped base layer of light-transmittible plastic material of a given color and of substantial rigidity at ordinary temperatures, a second *molten stream of synthetic plastic material to form a second* layer of a differently colored light-transmittible plastic material having an area of maximum thickness and diminishing in thickness from such area and for a major part of the width of such second layer toward a longitudinal edge thereof, and controlling the thicknesses of said layers so that the resulting composite strip at the thickest part thereof is capable of transmitting light, *cooling said united streams to form a substantially rigid composite strip,* and cutting such composite strip to produce a part having a gradient color appearance.

14. The method of making plastic material parts, which comprises forming a light-transmittible composite rectilinear strip of substantial rigidity at ordinary temperatures from which such a part having a gradient color appearance may be produced, by bringing together *and uniting in a closed conduit* into direct cohering engagement with the aid of heat, opposed surface portions of a rectilinearly-shaped base *stream* of *molten* light-transmittible plastic material of a given color and of substantial rigidity at ordinary temperatures, and a *stream* [strip] of a differently colored light-transmittible plastic material having an area of maximum thickness and diminishing in thickness from such area and for a major part of the width of such [strip] *stream* toward a longitudinal edge thereof, *and cooling said united streams to form said composite strip.*

15. The method of making plastic material parts, which comprises [taking] *forming* a light-transmittible composite, rectilinear strip of substantial rigidity at ordinary temperatures and composed of a base of light-transmittible plastic material of a given color to which is united a strip of a differently light-transmittible colored plastic material having an area of maximum thickness and diminishing in thickness from such area and for a major part of the width of such strip toward a longitudinal edge thereof *by uniting in a closed conduit two molten streams of differentially colored synthetic plastic material and cooling said united streams,* and advancing said composite strip into the field of action of cutting instrumentalities, and then in such field of action cutting parts from such composite strip in such manner that each of said parts has a gradient color appearance.

16. The method of making plastic material parts which comprises forming a light-transmittible composite, rectilinear strip of substantial rigidity at ordinary temperatures from which such a part having a gradient color appearance may be produced, by bringing together *and uniting in a closed conduit* into direct cohering engagement with the aid of heat, opposed surface portions of a rectilinearly-shaped base *stream* of *molten* light-transmittible plastic material of a given color and a [strip] *molten stream* of a differently colored plastic material capable of transmitting light and with its color uniformly distributed throughout its entire volume and having an area of maximum thickness and diminishing in thickness from such latter area and for a major part of the width of such [strip] *second-mentioned stream* toward a longitudinal edge thereof, and controlling the thickness of said base *stream* and [strip] *said second-mentioned stream* so that in said area of maximum thickness said composite strip is capable of transmitting light *and thereafter cooling said united streams to form said composite strip.*

17. The method of making plastic material parts which comprises forming a light-transmittible composite, rectilinear strip of substantial rigidity at ordinary temperatures from which such a part having a gradient color appearance may be produced, by bringing together *and uniting in a closed conduit* into direct cohering engagement with the aid of heat, opposed surface portions of a rectilinearly-shaped base *stream* of *molten* light-transmittible plastic material of a given color and a *molten stream of a* differently colored plastic material capable of transmitting light and with its color uniformly distributed throughout its entire volume, and forming said *stream of* differently colored plastic material to provide it with an area of maximum thickness and diminishing thickness from such area and for a major part of the width of such [strip] *second-mentioned stream* toward a longitudinal edge thereof and with outer surface portions disposed at an angle to underlying surface portions of said base material, *stream* and controlling the thickness of said base *stream* and [strip] *differentially colored stream* so that in said area of maximum thickness said composite strip is capable of transmitting light *and thereafter cooling said united streams to form said composite strip.*

References Cited

The following references, cited by the Examiner, are of record in the patented file of this patent or the original patent.

UNITED STATES PATENTS

| | | | |
|---|---|---|---|
| 1,005,454 | 10/1911 | Mijnssen | 161—269 |
| 1,465,423 | 8/1923 | Durgin | 251—423 |
| 1,510,001 | 9/1924 | Gunning | 264—277 |
| 1,649,516 | 11/1927 | Devine | 264—159 |
| 1,825,427 | 9/1931 | Siddall | 156—80 |
| 2,101,540 | 12/1937 | Gullich | 264—245 |
| 2,158,755 | 5/1939 | Hodgdon et al. | 161—145 |
| 2,397,243 | 3/1946 | Cooper | 351—49 |
| 2,444,831 | 7/1948 | Kilborn | 18—13 |
| 2,677,634 | 5/1954 | Collier | 156—250 |
| 2,715,258 | 8/1955 | Stegeman | 29—20 |
| 2,722,720 | 11/1955 | Karniol | 264—77 |
| 2,736,921 | 3/1956 | Mulbarger et al. | 264—171 |
| 2,842,028 | 7/1958 | Belgard | 351—52 |
| 2,879,547 | 3/1959 | Morris | 254—171 |

EARL M. BERGERT, *Primary Examiner.*

HAROLD ANSHER, *Examiner.*